(12) United States Patent
Dave et al.

(10) Patent No.: US 11,544,710 B2
(45) Date of Patent: Jan. 3, 2023

(54) PROVISIONING CREDENTIALS ON MULTIPLE ELECTRONIC DEVICES (71) Applicant: Apple Inc., Cupertino, CA (US)

(72) Inventors: Pritesh M. Dave, Fremont, CA (US);
David Harbige, Milton Keynes (GB);
Benjamin D. Chester, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 273 days.

(21) Appl. No.: 15/996,220

(22) Filed: Jun. 1, 2018

(65) Prior Publication Data

US 2018/0349904 A1 Dec. 6, 2018

Related U.S. Application Data (60) Provisional application No. 62/514,694, filed on Jun. 2, 2017.

(51) Int. Cl.
G06Q 20/40 (2012.01)
H04L 9/08 (2006.01)
G06Q 20/38 (2012.01)
G06Q 20/32 (2012.01)
G06Q 20/20 (2012.01)

(52) U.S. Cl.
CPC ....... *G06Q 20/4014* (2013.01); *G06Q 20/204* (2013.01); *G06Q 20/3226* (2013.01); *G06Q 20/389* (2013.01); *G06Q 20/3821* (2013.01); *G06Q 20/4018* (2013.01);
(Continued)

(58) Field of Classification Search
CPC ........... G06Q 20/4014; G06Q 20/3821; G06Q 20/389; G06Q 20/3226; G06Q 20/204; G06Q 20/4018; G06Q 2220/12; H04L 9/0861; H04L 9/0894; H04L 9/0866
See application file for complete search history.

(56) References Cited

U.S. PATENT DOCUMENTS 5,634,122 A 5/1997 Loucks et al.
7,318,234 B1 1/2008 Dharmarajan
(Continued)

FOREIGN PATENT DOCUMENTS

EP 3712792 A1 9/2020

OTHER PUBLICATIONS

White, "How Computers Work", 2003, Que Publishing, 7th Ed., p. 4 (Year: 2003).*
(Continued)

*Primary Examiner* — John W Hayes
*Assistant Examiner* — Taylor S Rak
(74) *Attorney, Agent, or Firm* — Dickinson Wright RLLP (57) ABSTRACT This application relates to re-provisioning of credentials, such as payment credentials, on a second electronic device from one or more credentials previously provisioned on a first electronic device. The one or more previously provisioned credentials may be stored on an external storage system and may be retrieved by the second electronic device for re-provisioning. The second electronic device may re-provision an instance of the one or more retrieved credentials for use in electronic transactions on the second electronic device using a secure element linked to the second electronic device and information that is unique to the one or more credentials being re-provisioned to the second electronic device.

20 Claims, 6 Drawing Sheets (52) U.S. Cl.
CPC .......... *H04L 9/0861* (2013.01); *H04L 9/0866* (2013.01); *H04L 9/0894* (2013.01); *G06Q 2220/12* (2013.01)

(56) References Cited

U.S. PATENT DOCUMENTS

| | | | |
|---|---|---|---|
| 8,181,028 | B1 | 5/2012 | Hernacki et al. |
| 9,723,003 | B1* | 8/2017 | McClintock .......... H04L 63/102 |
| 9,836,740 | B1 | 12/2017 | Geist et al. |
| 2003/0018785 | A1 | 1/2003 | Eshel et al. |
| 2006/0230437 | A1* | 10/2006 | Alexander Boyer ........................ H04L 63/062 726/4 |
| 2009/0063345 | A1 | 3/2009 | Erikson |
| 2009/0164681 | A1 | 6/2009 | Elhamias et al. |
| 2010/0325544 | A1 | 12/2010 | Alhadeff et al. |
| 2012/0239936 | A1* | 9/2012 | Holtmanns .......... H04L 9/3263 713/176 |
| 2013/0030985 | A1 | 1/2013 | Shebesta et al. |
| 2013/0041830 | A1* | 2/2013 | Singh ................ G06Q 20/3825 705/65 |
| 2014/0019367 | A1 | 1/2014 | Khan et al. |
| 2014/0026200 | A1* | 1/2014 | Ekberg ................. H04W 12/04 726/6 |
| 2014/0076965 | A1 | 3/2014 | Becorest et al. |
| 2014/0121789 | A1 | 5/2014 | Brandes et al. |
| 2014/0164241 | A1 | 6/2014 | Neuwirth |
| 2014/0324692 | A1 | 10/2014 | Yarbrough et al. |
| 2015/0046339 | A1 | 2/2015 | Wong et al. |
| 2015/0095238 | A1 | 4/2015 | Khan et al. |
| 2015/0100788 | A1* | 4/2015 | Chastain ............. H04L 63/0853 713/169 |
| 2015/0254699 | A1 | 9/2015 | Bondesen et al. |
| 2015/0339663 | A1 | 11/2015 | Lopreiato et al. |
| 2015/0348007 | A1 | 12/2015 | Khan et al. |
| 2015/0348025 | A1* | 12/2015 | Brown ................... G06Q 20/12 705/41 |
| 2015/0350177 | A1* | 12/2015 | Sharp ................. G06Q 20/3227 726/6 |
| 2016/0119296 | A1 | 4/2016 | Laxminarayanan et al. |
| 2016/0173483 | A1 | 6/2016 | Wong et al. |
| 2016/0191494 | A1 | 6/2016 | Claes et al. |
| 2016/0259464 | A1 | 9/2016 | Chan et al. |
| 2017/0103229 | A1 | 4/2017 | Gellas |
| 2017/0200152 | A1 | 7/2017 | Winkler et al. |
| 2017/0221047 | A1 | 8/2017 | Veerasangappa Kadi et al. |
| 2017/0270517 | A1* | 9/2017 | Vasu ................ G07C 9/00309 |
| 2017/0278096 | A1 | 9/2017 | Chitalia et al. |
| 2017/0352095 | A1 | 12/2017 | Jurss et al. |
| 2017/0373852 | A1 | 12/2017 | Cassin et al. |
| 2018/0005227 | A1 | 1/2018 | Sandelov et al. |
| 2018/0068293 | A1 | 3/2018 | Dunne |
| 2018/0349890 | A1 | 12/2018 | Dave et al. |

OTHER PUBLICATIONS

Kostiainen et al., Towards User-Friendly Credential Transfer on Open Credential Platforms, 2011, In: Lopez J., TsudikG. (eds) Applied Cryptography and Network Security. ACNS 2011. Lecture Notes in Computer Science, vol. 6715. Springer, Berlin, Heidelberg, p. 395-412 (Year: 2011).*

U.S. Appl. No. 15/995,542, Final Office Action dated Dec. 30, 2020 (15 pages).

U.S. Appl. No. 15/995,542, Non-Final Office Action dated Sep. 22, 2022 (23 pages).

* cited by examiner

PROVISIONING CREDENTIALS ON MULTIPLE ELECTRONIC DEVICES

CROSS-REFERENCE TO RELATED APPLICATIONS

The present application claims the benefit of U.S. Provisional Application No. 62/514,694, entitled "PROVISIONING CREDENTIALS ON MULTIPLE ELECTRONIC DEVICES," filed Jun. 2, 2017, the content of which is incorporated herein by reference in its entirety for all purposes.

FIELD

The described embodiments relate to provisioning and authentication of credentials on multiple electronic devices, including provisioning credentials for electronic transactions on multiple electronic devices.

BACKGROUND

Recent advances in portable computing allow for electronic transactions to be conducted on electronic devices wirelessly interacting with transaction platforms, such as via websites, applications, and the like. Such transactions typically commence with communication or exchange of secured data that includes payment information. As the number of electronic transactions increases and the types of transaction platforms continue to vary, the security requirements for transmission and exchange of secured data in electronic transactions become more complex, as do requirements for storage of payment information for use in electronic transactions. While these requirements may improve security of electronic transactions, compliance with such requirements can complicate user interaction and frustrate a user's experience. Furthermore, users may frequently utilize multiple electronic devices and/or frequently update or change from one electronic device to another electronic device; however, security requirements may prevent secure data from being shared or transferred between multiple electronic devices belonging to the same user.

SUMMARY

This disclosure describes various embodiments that relate to provisioning of credentials (e.g., payment credentials) to an electronic device, including re-provisioning credentials to a second electronic device from credentials previously provisioned at a first electronic device.

Such embodiments may include a first electronic device and a second electronic device, where the first electronic device may include one or more provisioned credentials. The one or more provisioned credentials may include different portions, where a portion of the provisioned credential is generated based on one or more values that are independent of the first electronic device. The provisioned credentials may be stored at a storage medium.

In some implementations, the second electronic device may retrieve one or more of the stored credentials from the storage medium. Once retrieved, the second electronic device may be configured to re-provision the one or more credentials for use on the second electronic device utilizing the retrieved credentials, a secure element linked to the second electronic device, and information that is unique to the credential input at the second electronic device.

Other aspects and advantages of the subject disclosure will become apparent from the following detailed description taken in conjunction with the accompanying drawings which illustrate, by way of example, the principles of the described embodiments. This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, where like reference numerals designate like structural elements.

DETAILED DESCRIPTION

Representative applications of methods and apparatus according to the present application are described in this section. These examples are being provided solely to add context and to aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

When activating or initializing new electronic devices (or expanding the capability of electronic devices already in use), data from a previously used electronic device may be transferred over. Not all data may be transferred, however, as secure data, such as provisioned credentials (e.g., payment credentials), may not be transferred to the new electronic device or may not function on the new (or additional) electronic device. The user of the new (or additional) electronic device may normally be required to separately provision one or more credentials for the second electronic device anew, even when the same credentials have previously been provided to another electronic device of the same user (or associated with a common user account). In the description below, credentials used for a payment transaction, e.g., payment credentials, are presented as an example; however, the techniques described also can be applied to other types of credentials, such as for access credentials, loyalty credentials, etc.

In some embodiments, a provisioning process is shortened and streamlined. For example, the user of a first electronic device that is associated with a user account may have provisioned one or more credentials configured for the first electronic device. The provisioned credentials may include portions that are generated at least in part based on values that are independent of the first electronic device and other portions that include values that are unique to the first electronic device, such as those generated by (or in conjunction with) a secure element of the first electronic device.

The provisioned credentials may be stored on an external storage medium for retrieval. In some examples, a portion of the credential that is generated from values that are independent of the first electronic device are stored on the external storage medium.

When the second electronic device is activated and associated with the user account, the second electronic device, having a unique secure element, may retrieve from the storage medium one or more of the provisioned credentials (either the full provisioned credential or a portion of the provisioned credential depending on which was transferred to the storage medium by the first electronic device).

At the second electronic device, the user may re-provision one or more credentials to be used by the second electronic device through a credential provisioning application, without requiring the generation of a portion of the provisioning credentials that was generated based on values that were independent of the first electronic device. In re-provisioning the one or more credentials, the second electronic device may use a portion of the provisioned credential retrieved from the storage medium, along with a new portion of the credentials that is based on one or more new values generated by (and/or based on) a secure element of the second electronic device. Furthermore, input of information that is unique to the credential being added to for the second electronic device may be required or optional, and can be included as part of the re-provisioning process.

These and other embodiments are discussed below with reference to FIGS. 1A to 6; however, those skilled in the art will readily appreciate that the detailed description given herein with respect to these figures is for explanatory purposes only and should not be construed as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Figure 1A:
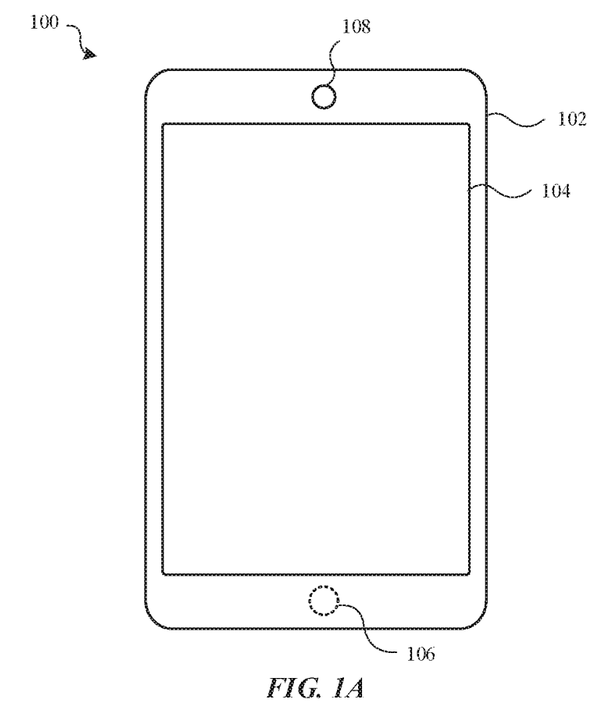
FIGS. 1A and 1B illustrate views of an exemplary electronic device.
Figure 1B:
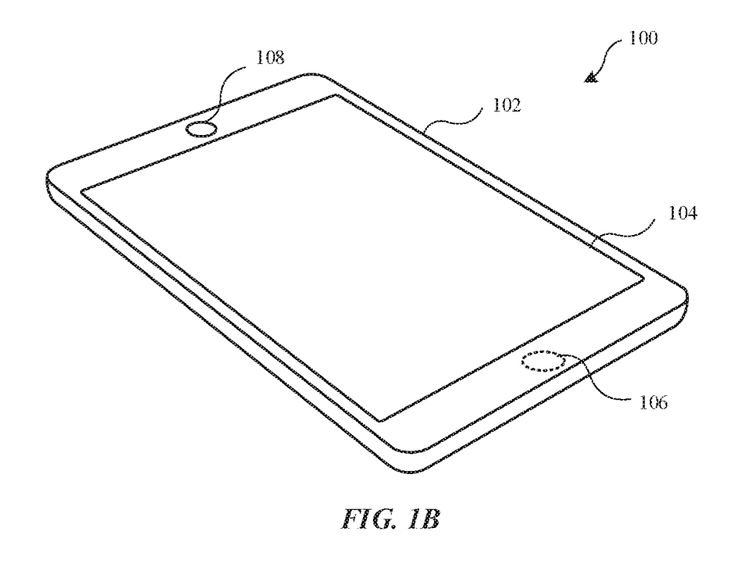

FIGS. 1A and 1B illustrate diagrammatic views of an exemplary electronic device 100 that may be used to conduct electronic transactions. Electronic device 100 can be a tablet computing device, for example, although other types and varieties of electronic devices can also apply for the various disclosed components and features disclosed herein. For example, the various embodiments disclosed herein could also be used with a smart phone, a media playback device, a personal digital assistant, a wearable device (e.g., a smart watch), a tablet computer, and/or a laptop computer, among other possible portable electronic devices. Portable electronic device 100 can include an outer housing 102, which can be adapted to hold a processor and other electronic components inside, and can also provide space for an exterior touchscreen or other display 104, one or more buttons, such as home button 106 and a camera 108, among other possible device components. In some embodiments, the home button 106 may be virtual and may be optionally included with the electronic device 100. In embodiments where the device 100 is provided with a touch display or touch-screen, the display 104 may have touch capabilities well suited for receiving a touch event (and/or, in embodiments where the device 100 includes a haptic device, providing haptic feedback as a touch event), that can be used, for example, to control various operation of the electronic device when appropriately configured.

Figure 2:
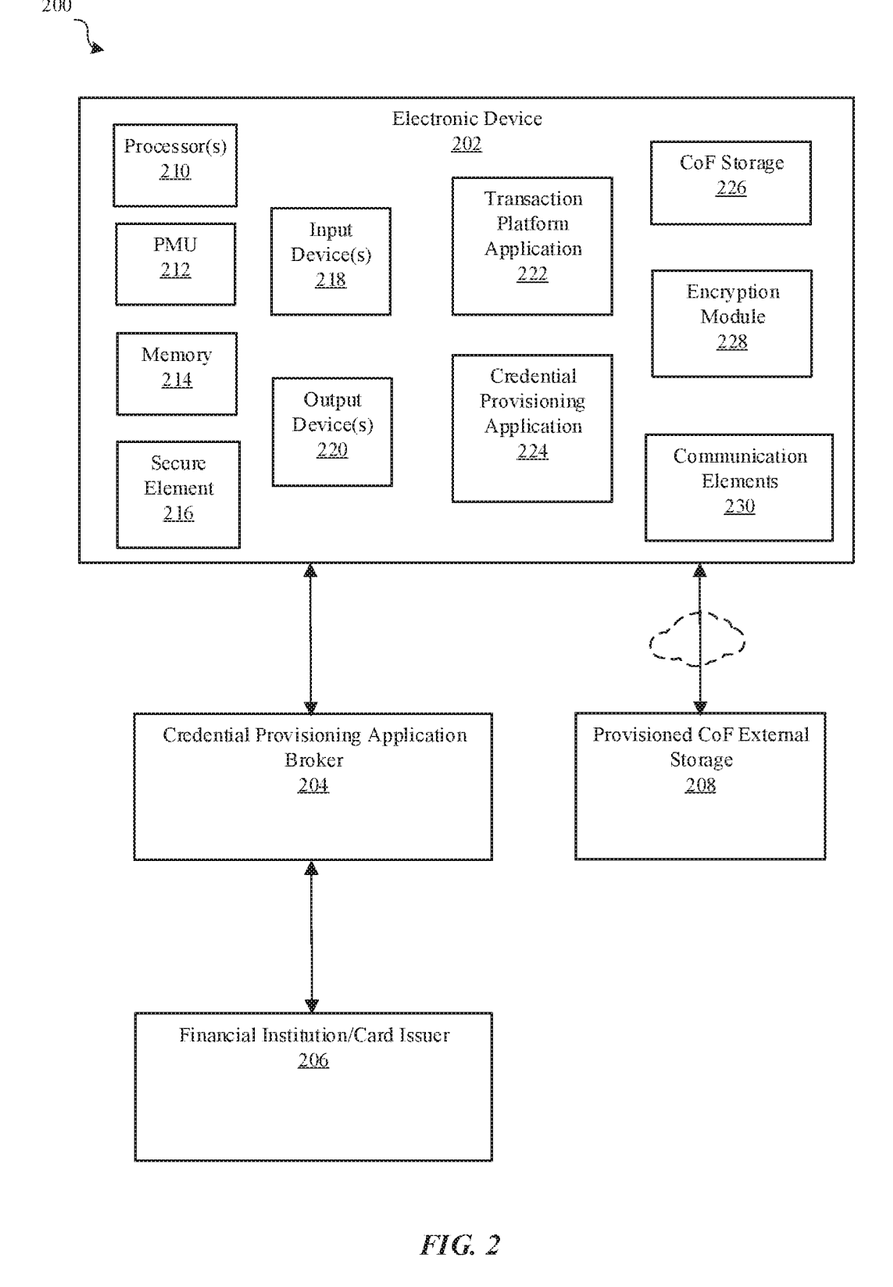
FIG. 2 illustrates a diagram of an exemplary system for conducting electronic transactions.

FIG. 2 illustrates a diagram of an exemplary system 200 for conducting electronic transactions. The system 200 includes an electronic device 202, a credential provisioning application (CPA) broker 204, a financial institution/card issuer 206, and a provisioned Card on File (CoF) external storage 208. The electronic device 202, the CPA broker 204, the financial institution/card issuer 206, and the provisioned CoF external storage 208 can communicate with each other, e.g., via internet connection(s) (as depicted). Those of skill in the art will understand other suitable connection arrangements between the components of system 200, as well as potential additional components may be used.

The electronic device 202 may include multiple internal components that, when operative together, conduct electronic transactions, among many other capabilities. The internal components of the electronic device 202 include, for example, one or more processors 210, a power management unit (PMU) 212, a memory 214 (e.g., a non-transitory computer readable storage medium), a secure element 216, input device(s) 218, output device(s) 220, a transaction platform application 222, a credential provisioning application (CPA) 224, a storage for cards on file (CoF) 226, an encryption module 228, and communication elements 230. The internal components of electronic device 202 shown in FIG. 2 are exemplary and not exclusive. Other suitable components for electronic devices will be understood by those of skill in the art.

The one or more processors 210 may also be referred to and/or as including control circuitry, a main processor, an applications processor, etc. The one or more processor 210 may be used to execute instructions (e.g., computer code) stored on the memory 214. The one or more processors 210 may control operation of the electronic device 202 and access storage such as memory 214, which may include hard-disk storage non-volatile memory (e.g., flash memory or other electrically-programmable-read-only memory forming a solid state drive), volatile memory (e.g., static or dynamic random access memory (SRAM/DRAM)), etc. Generally, the one or more processors 210 are utilized to run/operate software on the electronic device 202, such as internet browsing applications, voice-over-internet-protocol (VOIP) telephone call applications, email applications, media playback applications, operating system functions, etc. Such applications run by the one or more processors 210 may include a transaction platform application 222 and a credential provisioning application 224 installed or otherwise stored on the electronic device 202. The one or more processors 210 may be communicatively coupled to various components of the electronic device 202, such as the PMU 212, memory 214, secure element 216, input/output devices 218, 220, encryption module 228, communication elements 230, etc.

The PMU 212 may include, for example, a microcontroller that manages power functions for the electronic device 202. The PMU 212 may remain active (e.g., using a backup battery source) even when the other components of the electronic device 202 are idle or powered down. The PMU 212 is responsible for functions including but not limited to: monitoring power connections and battery charges, controlling power to other circuit components within the electronic device 202, shutting down unnecessary system components when they are left idle, controlling sleep and on/off power functions, and/or actively managing power consumption for optimum user performance, etc.

The electronic device 202 may also include a secure element 216. The secure element 216 may include a tamper-resistant component (e.g., as a single chip or multichip secure microcontroller) that securely hosts applications as well as confidential and/or cryptographic data for conducting electronic transactions. In some implementations, the secure element 216 may be provided as a universal integrated circuit card (UICC), an embedded SE, a smart secure digital (SD) card, a microSD card, etc. Sensitive user information such as credit card information and other commerce credentials may be stored on the secure element 216. The secure element 216 can provide a secure domain that protects user credentials and processes payment transactions in a trusted environment without compromising safety of the user's data. In general, each secure element 216 may include its own unique identifier sometimes referred to as a secure element identifier (SEID). No two secure elements use the same SEID, and the SEID cannot be altered. In some examples, provisioned credentials may be at least partially generated (e.g., provisioned) using properties of the secure element 216.

The electronic device 202 also includes one or more input devices 218 and one or more output devices 220, generally configured for accepting and inputting data (e.g., from a user, an accessory attachment, etc.) and for outputting/transmitting data (e.g., from the device, an accessory attachment, etc.). Input devices 218 and output devices 220 may include touch screens, displays with or without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, haptic sensors/feedback providers, etc.

The memory 214 may also include installed thereon a transaction platform application 222 (e.g., an application that provides the electronic device 202 access to a vendor transaction platform as described herein), a credential provisioning application 224 (e.g., an application that allows the electronic device to communicate with external system components for provisioning credential information in electronic transactions as described herein), and a CoF list 226 (e.g., a list of Cards on File that are stored on the electronic device 202, which have been provisioned or are otherwise accessible by the credential provisioning application 224 for use in electronic transactions). In some embodiments, the CoF list 226 is stored in additional or alternative locations and devices, such as an external, cloud-based storage (e.g., storage 208), at a CPA broker 204, with the financial institution/card issuer, 206, and the like.

The encryption module 228 of the electronic device 202 may be used in conjunction with the processor 210, secure element 216, input and output devices 218 and 220, transaction platform application 222, and credential provisioning application 224 for encrypting data received by the electronic device 202 during or otherwise for use with an electronic transaction, thereby securing the data. The encryption module 228 may include circuitry for encoding data (e.g., input credentials) once input into the electronic device 202 for secured storage and transmission. The encryption module 228 may work in conjunction with the secure element 216 to execute scripts (e.g., personalization/perso scripts) received from a financial institution 206 to provision credentials.

As described above, the electronic device 202 may include communication elements 230. The communication elements 230 may include wireless communications circuitry, such as radio-frequency (RF) transceiver circuitry formed from one or more integrated circuits, power amplifier circuitry, low-noise input amplifiers, passive RF components, one or more antennas, transmission lines, and other circuitry for handling RF wireless signals, etc. The communication elements 230 may also include satellite navigation system circuitry such as a global positioning system (GPS). The communication elements 230 may be compatible with Wi-Fi, Bluetooth, NFC (near-field communication), and other wireless communication formats used for conducting electronic transactions and/or exchange of secured data.

Further information on electronic device components, such as processors, power management units, memory, secure elements, input devices, output devices, encryption modules, and communication elements can be found in commonly owned U.S. Pat. No. 9,299,072, entitled "APPARATUSES AND METHODS FOR OPERATING A PORTABLE ELECTRONIC DEVICE TO CONDUCT MOBILE PAYMENT TRANSACTIONS," the contents of which is incorporated by reference herein for all purposes.

The system 200 for conducting electronic transactions may also include a credential provisioning application broker 204 and a financial institution (or card issuer) 206. The CPA broker 204 may act as a host for the credential provisioning application and/or as a centralized hub that operates and facilitates provisioning requests made by the credential provisioning application. The financial institution or card issuer may be a company that provides a payment type for which the credential is sought (e.g., a credit card/debit card provider). The CPA broker 204 and the financial institution 206 may communicate with each other such that data is exchanged in response to a provisioning request sent by, for example, the credential provisioning application 224 of the electronic device 202 as is described further herein with respect to FIG. 3. The system 200 may also include a provisioned CoF external storage 208 configured to store provisioned credential information externally from the electronic device 202.

Figure 3:
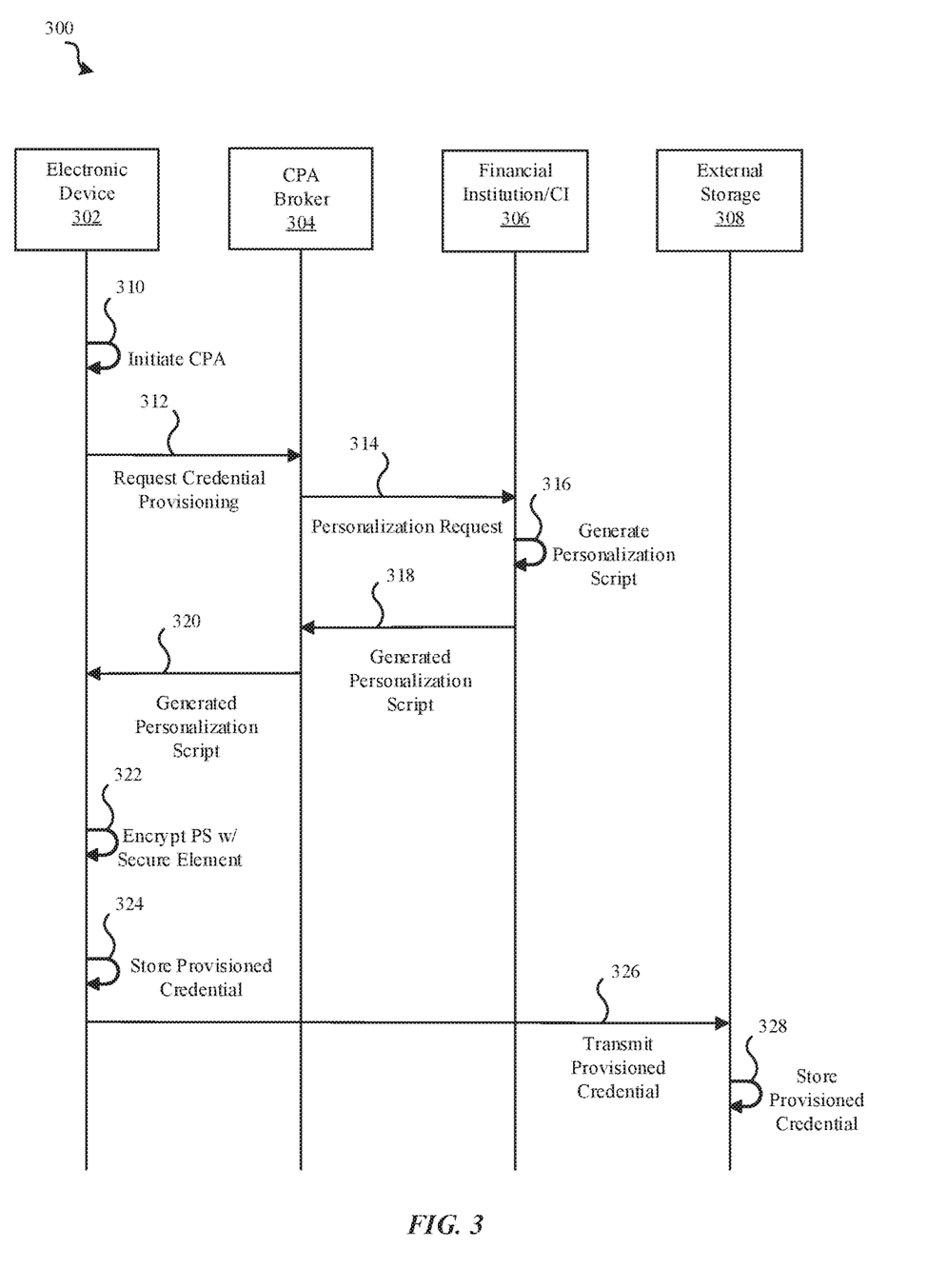
FIG. 3 illustrates a flow diagram of an exemplary credential provisioning process.

FIG. 3 illustrates a flow diagram 300 of an example of a data exchange for provisioning credentials that can be used in electronic transactions by electronic devices. The flow diagram 300 includes information transfers to and/or from an electronic device 302, a CPA broker 304, a financial institution or card issuer (CI) 306 and an external storage 308 (e.g., an external CoF storage). The embodiment shown in flow diagram 300 is exemplary and not exclusive, as additional steps or other suitable units may be utilized.

At 310, the credential provisioning application (CPA) is initiated (e.g., opened, activated, etc.) at the electronic device 302. In some implementations, the CPA may be an application into which a user of the electronic device 302 inputs payment information and/or credentials to be provisioned, such that the provisioned credential can be used to effect electronic payment. The CPA may be a single payment application configured to provision credentials (or at least initiate the provisioning process), store the provisioned credential, and submit electronic payments to a vendor for conducting and completing electronic transactions. In some examples, the CPA may be an application configured to receive credentials to be provisioned and facilitate the provisioned credentials to be stored in a separate electronic payment application (e.g., an electronic wallet) that can be used to effect or submit electronic payment for electronic transactions.

At 312, the electronic device 302 transmits a credential provisioning request to the CPA broker 304 (e.g., via the CPA initiated at 310). The credential provisioning request may include a request to provision one or more new credentials to the electronic device 302. In some implementations, the request may also include information identifying the credential to the CPA broker 304. The information identifying the credential, such as a credit card number, may be encrypted prior to the request for provisioning being transmitted to the CPA broker 304.

At 314, the CPA broker 304 transmits a personalization request to the financial institution/CI 306. The personalization request may include a request for the financial institution to generate a personalization script (or perso script) for the identified credential to be provisioned. At 316, the financial institution 306 generates the personalization script for the credential. At 318, the generated personalization script is transmitted from the financial institution/CI 306 to the CPA broker 304. At 320, the CPA broker 304 transmits the generated personalization script to the electronic device 302.

At 322, the electronic device 302 executes the personalization script to provision the credential. In some embodiments, the electronic device 302 executes the personalization script using a secure operating system (OS) of the secure element to provision (or install) the credential. Once the credential has been provisioned (e.g., installed) on the secure element and is validated for use in transactions, the provisioning process may be completed. In addition, the provisioned credential (or a representation thereof, including some or all of the associated credential information) may be stored at the electronic device 302 (e.g., in the CoF storage, locally on the secure element of the electronic device, etc.) at 324. Optionally, in some implementations, the credential information may be transmitted to the external storage 308 at 326 (e.g., to a cloud account associated with a user) and/or stored in a CoF storage of the external storage 308 at 328.

Figure 4:
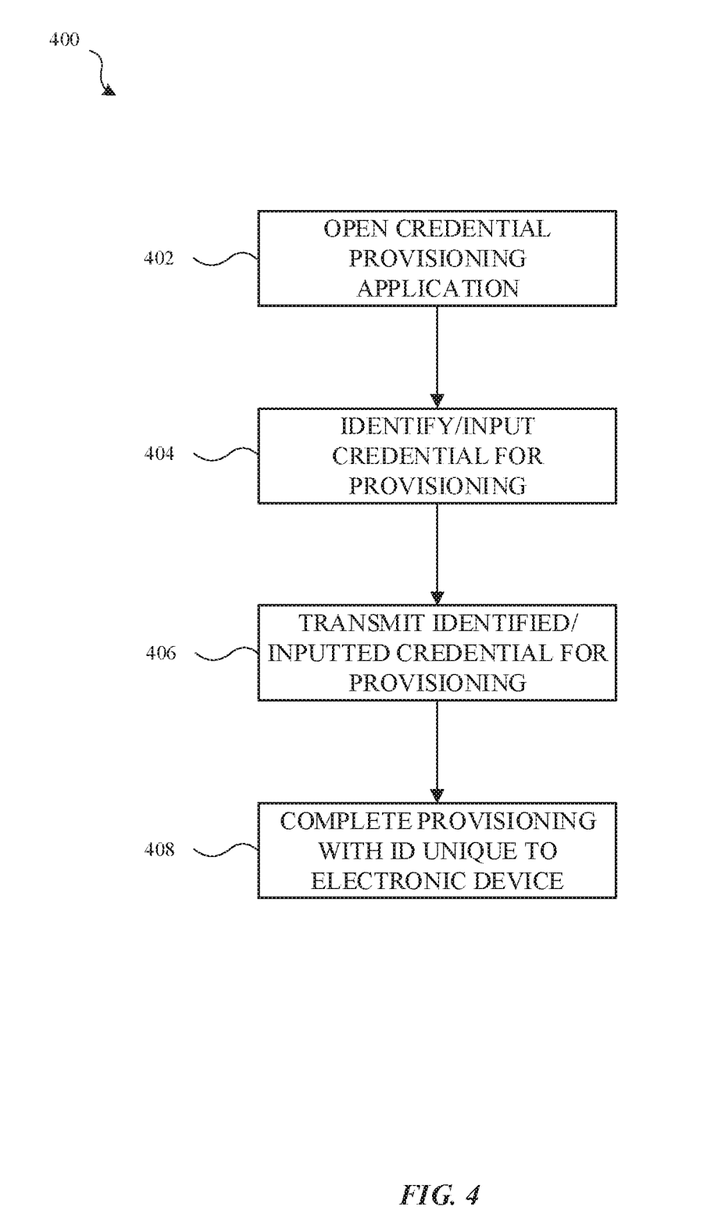
FIG. 4 illustrates a flowchart of an exemplary process for provisioning credentials.

FIG. 4 illustrates a flowchart 400 of an example method for provisioning a credential. At 402, a credential provisioning application is opened. For example, an electronic device may have stored thereon the CPA, and the CPA may be opened with the electronic device. At 404, a credential is identified and/or input. The credential may be identified/input into the device by an input device (e.g., through image capture, electronic scanning, manual entry, etc.). At 406, the input credential (or associated identifying information) is transmitted (e.g., to a card issuer and/or a CPA broker) for provisioning. The input credential may be encrypted prior to transmission.

At 408, the provisioning is completed using an identifier (ID) that is unique to the electronic device. For example, a script or hash (e.g., a personalization script or perso script) associated with the credential may be received by the electronic device, and using an operating system (OS) of the secure element of the electronic device, the provisioning may be completed by executing the received script or hash with the unique ID for the electronic device to install the credential. As such, the provisioned credential may be provisioned such that it may only be utilized with the electronic device having the unique ID used to complete the provisioning.

With a variety of electronic devices and products that are capable of conducting electronic transactions available to consumers, a user may have multiple electronic devices for conducting electronic transactions, and the user may switch or upgrade to new electronic devices. The user may have a user account with which electronic devices of the user are associated. In some scenarios, a user account is not necessarily linked to all electronic devices owned by a user. Information can be shared via the user account and used by multiple electronic devices and/or be transferred to (or between) electronic devices associated with the user account, including to new electronic devices. As shown at 408, however, secured data, such as provisioned credentials, may not easily transfer between electronic devices, including between electronic devices that are associated with (or share) a common user account. For example, a user may upgrade to a new electronic device and wish to transfer information from an older, previously used electronic device to the new electronic device. Secured data on the previous, older electronic device may have been derived based on a secure element or other information that is tied to the older electronic device, and as such, the secured data is provisioned for the older electronic device uniquely and may be unusable on (and nontransferable to) another electronic device, such as the new electronic device. In another example, a user may wish to install one or more credentials provisioned on a first device to a second device, such that they also can be used from that device.

Provisioning credentials (e.g., credit card information, debit card information, store card information, bank account information, and/or other payment transaction information, loyalty card information, access information, etc.) on the newly added electronic device may be time consuming and potentially error prone. When initializing (or personalizing) a new electronic device associated with the user account or when expanding the capabilities of an existing electronic device associated with the user account, a user may prefer that data, including stored provisioned credentials, transfer or load onto the new electronic device, such as from a previous (or existing) electronic device (and/or via a storage/memory backup storing data from the previous electronic device).

Figure 5:
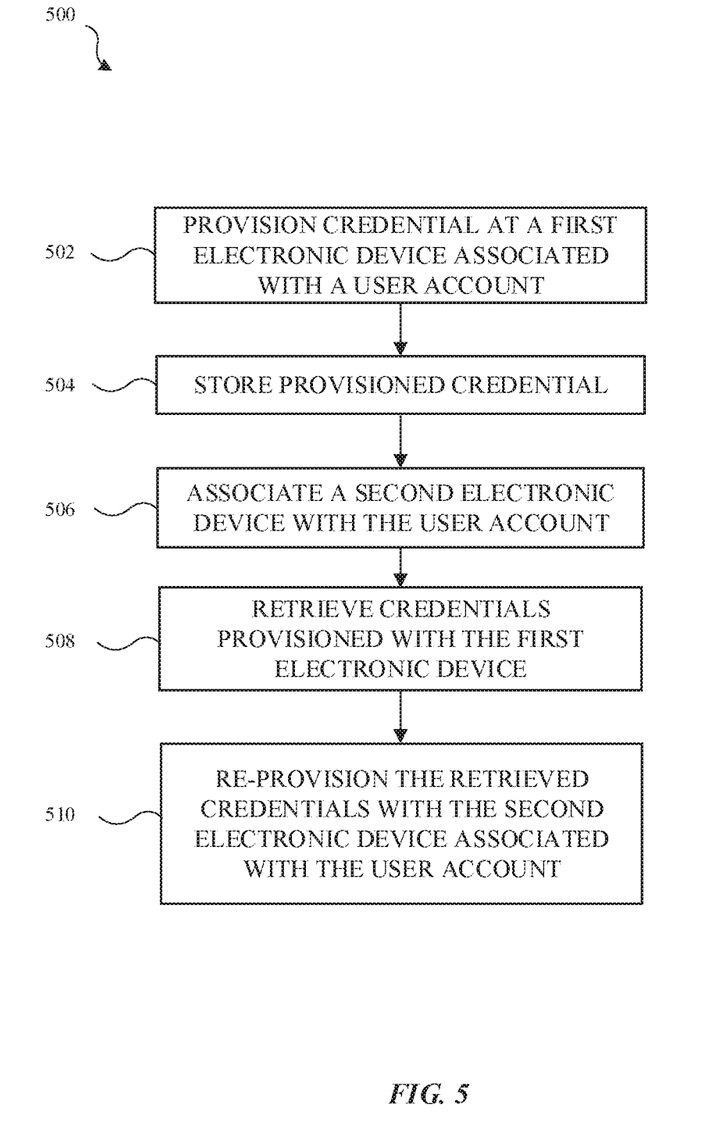
FIG. 5 illustrates a flowchart of an exemplary process for re-provisioning credentials.
Figure 6:
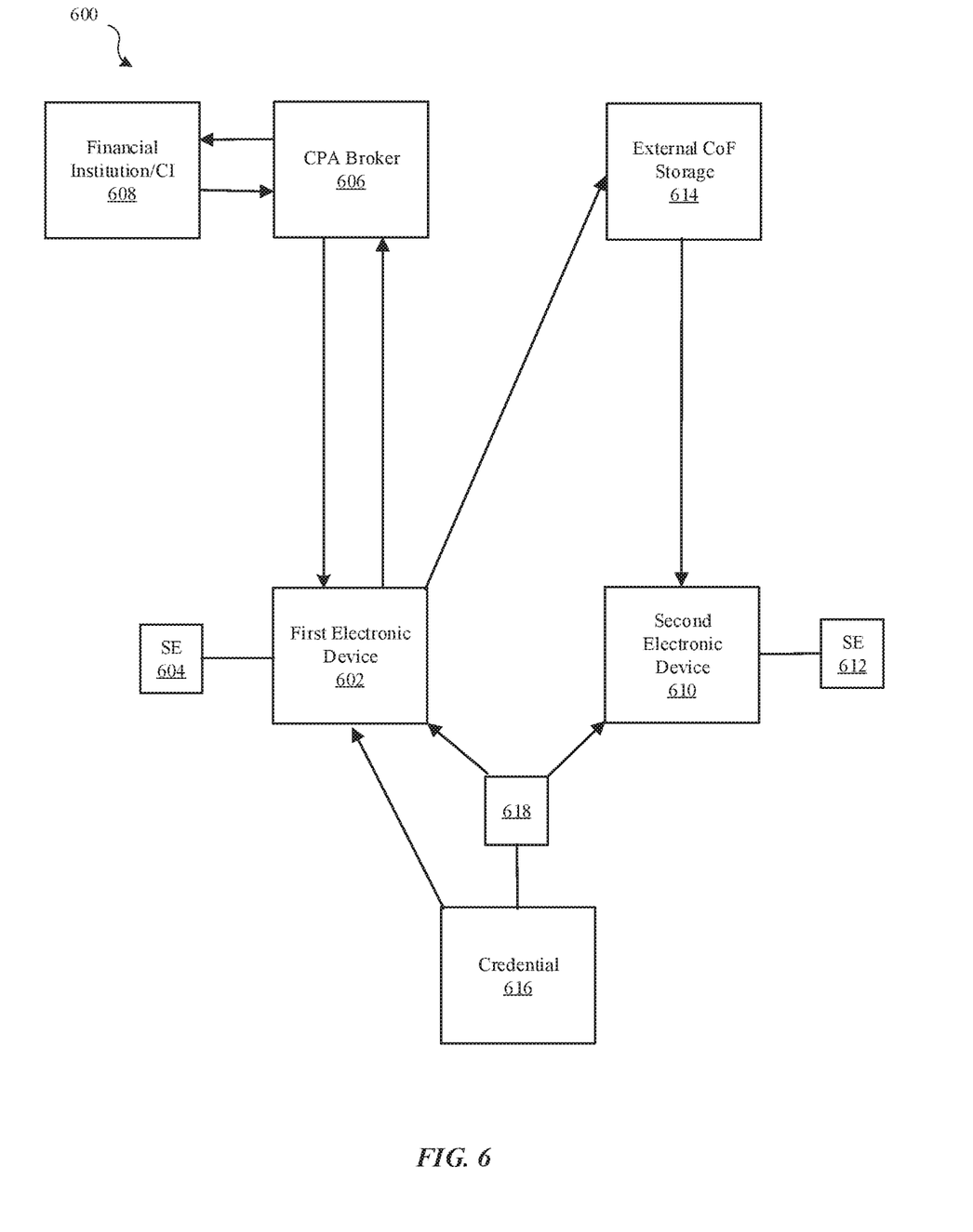
FIG. 6 illustrates a diagram of an exemplary system for re-provisioning credentials.

Referring next to FIGS. 5 and 6, electronic devices, systems, methods, processes for conducting electronic transactions that are capable of re-provisioning credentials are described. FIG. 5 illustrates a flowchart 500 of an exemplary method for re-provisioning credentials to a second or subsequent electronic device. FIG. 6 illustrates a diagram 600 depicting provisioning credentials in a first electronic device and re-provisioning the credentials to the second electronic device.

At 502, a credential is provisioned in a first electronic device. The first electronic device may be associated with a user account. In some embodiments, multiple credentials are provisioned such that multiple payment options are selectable at the device, e.g., for submitting payment for electronic transactions. Referring to FIG. 6, the first electronic device 602 is linked with a secure element 604, which may be internal or external to the first electronic device 602. Additionally, a credential 616 may include information 618 that is unique to the credential (e.g., a card verification value (CVV), a billing zip code, a personal identification number (PIN), a fingerprint association, an item of biometric information, smart chip information, etc.).

In some examples of provisioning, e.g., through a credential provisioning application, the credential 616 may be input at the first electronic device 602 (along with the information 618 that is unique to the credential). The first electronic device 602 transmits the information to the CPA broker 606, which further sends credentials to the financial institution 608. After processing, an installation package (e.g., a personalization script) associated with the credential 616 is sent back to the first electronic device 602 (as described herein with respect to FIGS. 1 to 4) for use in provisioning an electronic version of the credential. When the first electronic device 602 receives the package corresponding to the credential, the package may include an encrypted or alternative value that is generated independent of other values associated with the first electronic device 602. With the secure element 604 linked to the first electronic device 602, the credential may be provisioned such that the provisioned credential is generated with information that is not associated with the first electronic device 602 and also with information that is unique to or linked to the first electronic device 602. Put alternatively, the provisioned credential may include a portion generated with a value independent of the first electronic device 602, along with a portion generated with a secure element 604 or in conjunction with other information that is unique to the first electronic device 602.

At 504, the provisioned credential is stored, e.g., at the secure element 604. Additionally, the provisioned credential (or information associated therewith) may be stored in a storage system 614, such as an external server system or other cloud-based system separate from the first electronic device 602 and/or the second electronic device 610, although it is contemplated that the storage system 614 may be integrated with the first electronic device 602 and/or the second electronic device 610. In some embodiments, a portion of the provisioned credential is stored. For example, a portion of the provisioned credential that is generated independent from values that are unique to the first electronic device 602 may be transmitted and stored securely within the external storage system 614, which can maintain a backup of cards on file (CoF), e.g., associated with the user account. In some embodiments, the portion of provisioned credentials stored may not be used on their own, as the additional portion that is generated based on the secure element 604 or other information that is unique to the first electronic device 602 would be needed to utilize the portion of the credential for an electronic transaction.

At 506, a second electronic device 610 is associated with the user account. The second electronic device 610 may be an electronic device that can be used for electronic transactions in place of the first electronic device 602, in conjunction with/addition to the first electronic device 602, or simultaneously with the first electronic device 602. A data transfer may occur between the first electronic device 602 and the second electronic device 610. However, certain secured data, such as the credentials may not be transferred, or, alternatively, may be transferred but may be inoperable on the second electronic device 610. For example, a credential associated with the first electronic device 602 may be configured based on the secure element 604 linked to the first electronic device 602.

Thus, at 508, any/all of the credentials provisioned on/to the first electronic device 602 may be retrieved. The second electronic device 610 may retrieve the credentials. In some embodiments, the credentials may be retrieved from the storage 614. Additionally or alternatively, information sufficient to identify the one or more credentials may be retrieved from the first electronic device 602. A portion of the credential may be stored on the external storage 614, such that the second electronic device 610 may only retrieve the portion of the credential generated with values independent from the first electronic device 602.

At 510, the retrieved credentials are re-provisioned on/to the second electronic device 610. The second electronic device 610 may re-provision the credentials using the secure element 612 linked to the second electronic device 610. With the credential provisioning application, the CPA may prompt a user to select one or more credentials from multiple credentials that have been provisioned on the previous device 602. For example, an interface can be presented showing any/all of the credentials provisioned on the first electronic device 602 and permitting selection of one, some, or all of those credentials for provisioning onto the second electronic device 610. The retrieved credentials may be re-provisioned while requesting entry or input of information 618 that is unique to the credential 616 at the second electronic device 610. In some embodiments, the retrieved credentials may be provisioned on the second electronic device once a verification is performed, such as entry or input of information 618 that is unique to the credential 616, such as a CVV, security code, etc. In some embodiments, input of additional information is not required to initiate and/or conduct the re-provisioning procedure.

Advantageously, in some implementations, the second electronic device 610 can provision credentials without the need to repeat the entire provisioning process with the CPA broker 606 and the financial institution/CI 608. For example, the second electronic device 610 can use the retrieved stored information associated with the credential to provision a local copy. Additionally, in other embodiments, the second electronic device 610 can re-provision credentials while limiting an amount of interactivity required by the user of the second electronic device 610 as compared to the amount of interactivity required to initially provision the credentials at the first electronic device 602 (e.g., without the need to repeat the provisioning process with the CPA broker 606 and the financial institution/CI 608 as is conducted at the first electronic device 602). In some other implementations, the second electronic device 610 can use the retrieved stored information to initiate provisioning of a credential to the secure element 612 through interaction with either or both of the CPA broker 606 and the financial institution/CI 608. However, through use of the retrieved stored information, the second electronic device 610 can eliminate the need for entry of credential identifying information, such as through image capture, electronic scanning, and/or manual entry of credential identifying information, although verification/validation may still be required.

Representative Embodiments

In some embodiments, a method of provisioning a credential used to conduct electronic transactions includes a first electronic device: (i) provisioning a credential for the first electronic device, where the first electronic device is associated with a user account; (ii) storing the provisioned credential on a storage system, where the provisioned credential is associated with the user account; and a second electronic device associated with the user account: (iii) retrieving from the storage system the stored provisioned credential associated with the user account; and (iv) re-provisioning the retrieved credential on the second electronic device for use in an electronic transaction.

In some embodiments, the provisioning the credential for the first electronic device includes encrypting the credential with a first secure element of the first electronic device. In some embodiments, the re-provisioning the retrieved credential on the second electronic device includes encrypting the retrieved credential with a second secure element of the second electronic device. In some embodiments, the storage system includes an external server storage separate from both the first electronic device and the second electronic device. In some embodiments, the re-provisioning the retrieved credential for the second electronic device includes inputting, at the second electronic device, information that is unique to the retrieved credential. In some embodiments, the retrieved credential includes a payment credential, and the information that is unique to the retrieved credential includes a card verification value (CVV). In some embodiments, the provisioned credential for the first electronic device is based at least in part on a first value that is independent of the first electronic device and on a second value that is unique to a first secure element of the first electronic device. In some embodiments, the storing the provisioned credential includes storing the first value that is independent of the first electronic device. In some embodiments, the second electronic device retrieves from the storage system the stored provisioned credential based at least in part on the first value that is independent of the first electronic device.

In some embodiments, an electronic device associated with a user account includes: (i) a processor; (ii) a non-transitory computer readable storage medium storing a credential provisioning application; and (iii) a communication element that facilitates exchange of data between the electronic device and external systems, where execution of instructions by the processor causes the electronic device to: retrieve, from a storage system, a provisioned credential associated with the user account, the provisioned credential having been previously provisioned on an other electronic device associated with the user account; and re-provision the retrieved credential using a secure element of the electronic device.

In some embodiments, the storage system includes an external server storage separate from the electronic device and the other electronic device. In some embodiments, execution of the instructions further causes the electronic device to re-provision the retrieved credential by prompting for input of information that is unique to the retrieved credential. In some embodiments, the retrieved credential includes a payment credential, and the information that is unique to the retrieved credential includes a card verification value (CVV). In some embodiments, execution of the instructions further causes the electronic device to re-provision the retrieved credential using the information that is unique to the retrieved credential.

In some embodiments, a non-transitory computer readable storage medium is configured to store instructions that, when executed by a processor included in an electronic device associated with a user account, cause the electronic device to carry out a method that includes: (i) retrieving from a storage system a provisioned credential associated with the user account, the provisioned credential having been provisioned previously on a second electronic device associated with the user account; and (ii) re-provisioning an instance of the retrieved credential on the electronic device using information that is unique to the re-provisioned credential.

In some embodiments, the retrieved credential includes a portion based on at least one value that is independent of the second electronic device associated with the user account. In some embodiments, the re-provisioning the retrieved credential includes re-provisioning the retrieved credential using at least one value based on a secure element linked to the electronic device. In some embodiments, the credential includes a payment credential, and the information that is unique to the credential includes a card verification value (CVV). In some embodiments, the storage system includes an external server storage separate from the electronic device and the second electronic device. In some embodiments, the method further includes, before retrieving the provisioned credential, receiving a selection of at least one credential of multiple credentials previously provisioned on the second electronic device for re-provisioning.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A first computing device configured to perform electronic transactions using provisioned credentials, the first computing device comprising:
    a first secure element;
    at least one processor; and
    at least one memory storing instructions that, when executed by the at least one processor, cause the first computing device to perform steps that include:
        accessing at least a portion of a provisioned credential associated with a second computing device, wherein:
            the provisioned credential is based at least in part on a second value that is unique to a second secure element of the second computing device and a credential value that is unique to the provisioned credential, and
            the at least a portion of the provisioned credential includes at least the credential value;
        prompting for an input of a verification value for verifying the credential value; and
        in response to determining that the verification value corresponds to the credential value:
            obtaining, from the first secure element, a first value that is unique to the first secure element,
            generating a re-provisioned credential based on:
                the at least a portion of the provisioned credential, and
                the first value, and
            provisioning the re-provisioned credential on the first computing device to enable the first computing device to perform electronic transactions using the re-provisioned credential.

2. The first computing device of claim 1, wherein the at least a portion of the provisioned credential is received from the second computing device or from an external storage device.

3. The first computing device of claim 1, wherein the re-provisioned credential is further generated based on an identifier that is unique to a payment credential associated with both the provisioned credential and the re-provisioned credential.

4. The first computing device of claim 3, wherein the identifier is a card verification value (CVV) that is received as an input at the first computing device prior to generating the re-provisioned credential.

5. The first computing device of claim 1, wherein the first computing device accesses the at least a portion of the provisioned credential in response to identifying that the first and second computing devices are associated with a same user account.

6. The first computing device of claim 1, wherein the credential value comprises a credit card number that is unique to a payment credential associated with both the provisioned credential and the re-provisioned credential.

7. The first computing device of claim 1, wherein the steps further include, prior to accessing the at least a portion of the provisioned credential:
    receiving a selection of at least one provisioned credential of multiple provisioned credentials provisioned on the second computing device.

8. A method for enabling a first computing device to perform electronic transactions using provisioned credentials, the method comprising, at the first computing device:
    accessing at least a portion of a provisioned credential associated with a second computing device, wherein:
        the provisioned credential is based at least in part on a second value that is unique to a second secure element of the second computing device and a credential value that is unique to the provisioned credential, and
        the at least a portion of the provisioned credential includes at least the credential value;
    prompting for an input of a verification value for verifying the credential value; and
    in response to determining that the verification value corresponds to the credential value:
        obtaining, from a first secure element of the first computing device, a first value that is unique to the first secure element,
        generating a re-provisioned credential based on:
            the at least a portion of the provisioned credential, and
            the first value, and
        provisioning the re-provisioned credential on the first computing device to enable the first computing device to perform electronic transactions using the re-provisioned credential.

9. The method of claim 8, wherein the at least a portion of the provisioned credential is received from the second computing device or from an external storage device.

10. The method of claim 8, wherein the re-provisioned credential is further generated based on an identifier that is unique to a payment credential associated with both the provisioned credential and the re-provisioned credential.

11. The method of claim 10, wherein the identifier is a card verification value (CVV) that is received as an input at the first computing device prior to generating the re-provisioned credential.

12. The method of claim 8, wherein the first computing device accesses the at least a portion of the provisioned credential in response to identifying that the first and second computing devices are associated with a same user account.

13. The method of claim 8, wherein the credential value comprises a credit card number that is unique to a payment credential associated with both the provisioned credential and the re-provisioned credential.

14. The method of claim 8, further comprising, prior to accessing the at least a portion of the provisioned credential:
receiving a selection of at least one provisioned credential of multiple provisioned credentials provisioned on the second computing device.

15. A non-transitory computer readable storage medium configured to store instructions that, when executed by a processor included in a first computing device, cause the first computing device to perform electronic transactions using provisioned credentials, by carrying out steps that include:
accessing at least a portion of a provisioned credential associated with a second computing device, wherein:
the provisioned credential is based at least in part on a second value that is unique to a second secure element of the second computing device and a credential value that is unique to the provisioned credential, and
the at least a portion of the provisioned credential includes at least the credential value;
prompting for an input of a verification value for verifying the credential value; and
in response to determining that the verification value corresponds to the credential value:
obtaining, from a first secure element of the first computing device, a first value that is unique to the first secure element,
generating a re-provisioned credential based on:
the at least a portion of the provisioned credential, and
the first value, and
provisioning the re-provisioned credential on the first computing device to enable the first computing device to perform electronic transactions using the re-provisioned credential.

16. The non-transitory computer readable storage medium of claim 15, wherein the at least a portion of the provisioned credential is received from the second computing device or from an external storage device.

17. The non-transitory computer readable storage medium of claim 15, wherein the re-provisioned credential is further generated based on an identifier that is unique to a payment credential associated with both the provisioned credential and the re-provisioned credential.

18. The non-transitory computer readable storage medium of claim 17, wherein the identifier is a card verification value (CVV) that is received as an input at the first computing device prior to generating the re-provisioned credential.

19. The non-transitory computer readable storage medium of claim 15, wherein the first computing device accesses the at least a portion of the provisioned credential in response to identifying that the first and second computing devices are associated with a same user account.

20. The non-transitory computer readable storage medium of claim 15, wherein the credential value comprises a credit card number that is unique to a payment credential associated with both the provisioned credential and the re-provisioned credential.

\* \* \* \* \*